(12) United States Patent
Fischer et al.

(10) Patent No.: US 9,417,147 B2
(45) Date of Patent: Aug. 16, 2016

(54) OPTICAL SENSOR

(75) Inventors: Balthasar Fischer, Vienna (AT); Friedrich Reining, Vienna (AT); Ernst Wintner, Oberweiden (AT)

(73) Assignee: XARION LASER ACOUSTICS GMBH, Vienna (AT)

( * ) Notice: Subject to any disclaimer, the term of this patent is extended or adjusted under 35 U.S.C. 154(b) by 219 days.

(21) Appl. No.: 14/117,445

(22) PCT Filed: May 16, 2012

(86) PCT No.: PCT/EP2012/059122
§ 371 (c)(1),
(2), (4) Date: Nov. 14, 2013

(87) PCT Pub. No.: WO2012/163681
PCT Pub. Date: Dec. 6, 2012

(65) Prior Publication Data
US 2015/0139451 A1 May 21, 2015

(30) Foreign Application Priority Data

May 16, 2011 (EP) .................................... 11166253

(51) Int. Cl.
*G01L 11/02* (2006.01)
*G01D 5/26* (2006.01)
*H04R 23/00* (2006.01)
*G01B 9/02* (2006.01)
*G02F 1/21* (2006.01)

(52) U.S. Cl.
CPC .............. *G01L 11/02* (2013.01); *G01B 9/0207* (2013.01); *G01D 5/266* (2013.01); *H04R 23/008* (2013.01); *G01B 9/02* (2013.01); *G02F 1/216* (2013.01)

(58) Field of Classification Search
CPC ..................................... G01J 3/26; G01B 9/02
USPC .......................... 356/519, 469, 506, 450, 454
See application file for complete search history.

(56) References Cited

U.S. PATENT DOCUMENTS

| | | | |
|---|---|---|---|
| 5,886,247 A * | 3/1999 | Rabbett | G01N 21/3504 250/339.13 |
| 7,224,464 B2 | 5/2007 | Manning | |
| 7,224,465 B2 * | 5/2007 | Balachandran | G01D 5/35303 356/480 |
| 8,007,609 B2 * | 8/2011 | Carr | C09J 5/00 156/60 |
| 2005/0146726 A1 | 7/2005 | Balachandran et al. | |
| 2007/0165238 A1 | 7/2007 | Boyd | |
| 2007/0206202 A1 * | 9/2007 | Carr | G01H 9/006 356/519 |

(Continued)

OTHER PUBLICATIONS

International Search Report for PCT/EP2012/059122, mailed Aug. 3, 2012; ISA/EP.

*Primary Examiner* — Disler Paul
(74) *Attorney, Agent, or Firm* — Harness, Dickey & Pierce, P.L.C.

(57) ABSTRACT

A device comprising measurement (7) and reference (3) interferometers is disclosed. Each interferometer is configured to receive light from the same light source (1) and to emit light to respective detectors (6) and has a respective operating point. The measurement interferometer (7) is configured to respond to variations in a physical parameter by varying the intensity of light emitted, whereas the reference interferometer (3) is configured to be unresponsive to variations in the physical parameter. The device further comprises a signal processor for generating a differential output signal depending on respective output signals generated by the detectors (6).

16 Claims, 4 Drawing Sheets

(56) References Cited

U.S. PATENT DOCUMENTS

| | | | | |
|---|---|---|---|---|
| 2008/0163686 A1* | 7/2008 | Carr | ............ | G01L 9/0079 73/514.26 |
| 2008/0165366 A1* | 7/2008 | Schmitt | ............ | A61B 5/0066 356/519 |
| 2011/0105867 A1* | 5/2011 | Schultz | ............ | A61B 5/0059 600/316 |
| 2011/0170117 A1* | 7/2011 | Fischer | ............ | H04R 23/008 356/519 |
| 2015/0139451 A1* | 5/2015 | Fischer | ............ | G01D 5/266 381/111 |

\* cited by examiner

OPTICAL SENSOR

CROSS-REFERENCE TO RELATED APPLICATIONS

This application is a 371 U.S. National Stage of International Application No. PCT/EP20121/059122, filed May 16, 2012, and claims priority to European Patent Application No. 11166253.2, filed May 16, 2011, the disclosures of which are herein incorporated by reference in their entirety.

FIELD OF INVENTION

The invention relates to a device comprising a measurement interferometer, which can be used to form an optical sensor. It also relates to a layer structure from which the device can be built and to an optical microphone comprising the device.

BACKGROUND OF INVENTION

Various types of optical sensor make use of interferometers to detect changes in a physical parameter. In such sensors, light from a laser is coupled into an interferometer, which is influenced by changes in the physical parameter to produce corresponding changes in the interference pattern. These changes in the interference pattern manifest as changes in intensity, which can be detected by a photodetector.

Various different physical parameters can be used to cause a change in the interference pattern and hence can be sensed by this type of sensor. Examples include pressure (including air pressure), strain and displacement.

The signal-to-noise ratio (SNR) of such sensors is often limited by noise caused by fluctuations in intensity or frequency of the light output from the laser. There are various methods for stabilizing laser frequency. For example, one method makes use of a Fabry-Pérot interferometer or etalon to generate an error signal. The etalon converts frequency fluctuations into intensity fluctuations, which can be detected by a photodetector. The resulting photocurrent is used as a feedback signal, which can either act on the laser supply current or move a cavity mirror, for example, to correct the frequency fluctuations.

However, this kind of arrangement is bulky and expensive. It is incompatible with many applications where use of optical sensors would be desirable. For example, in mobile communication devices, microphones are required that are highly stable and resistant to shock, insusceptible to wind noise. These features can all be provided by an optical microphone making use of a laser light source and interferometer since these do not have moving parts, such as a membrane. However, it is also required that such microphones are compact and have a high SNR. Whilst the stabilization technique referred to above can compensate for laser frequency noise to a certain extent, it cannot compensate of relative intensity noise.

SUMMARY OF INVENTION

According to the invention, there is provided a device comprising measurement and reference interferometers, each configured to receive light from the same light source and to emit light to respective detectors and having a respective operating point, wherein the measurement interferometer is configured to respond to variations in a physical parameter by varying the intensity of light emitted, whereas the reference interferometer is configured to be unresponsive to variations in the physical parameter, the device further comprising a signal processor for generating a differential output signal depending on respective output signals generated by the detectors.

Light from the same light source is coupled into both a reference interferometer that is insensitive or unresponsive to variations in a physical parameter to be sensed and into a measurement interferometer that is responsive to such variations. Therefore, both interferometers will be affected by fluctuations in the light from the light source, but only the measurement interferometer will be influenced by changes in the physical parameter; the reference interferometer is isolated from these changes. The interference pattern in the reference interferometer thus represents the noise from the light source only as does the signal from its respective detector. This signal can be used to compensate for noise from the light source in the signal from the measurement interferometer's respective detector, such that the signal represents changes in the physical parameter only. The SNR is therefore increased, and furthermore, the device may be made to be very compact since the only additional component required is the reference interferometer.

The operating point of each of the reference and measurement interferometer is selected to achieve a linear variation of the transmission of the interferometer with frequency. FIG. 5 shows a graph of the transmission (normalized to a maximum value of 1) against a parameter "q", where $q=4\pi nd/\lambda$ (n is refractive index in the interferometer cavity; d is the spacing between the interferometer mirrors; and $\lambda$ is the wavelength of light). The parameter q is of course proportional to the frequency of light. The relationship between transmission and q is represented by the so-called "Airy function". FIG. 5 also shows graphs of the first and second derivatives of the transmission versus q graph. The best linearity of the transmission versus q is found at a point where the second derivative is zero. The point where the second derivative of the relationship of transmission with q is zero is therefore preferably selected as the operating point for each interferometer.

The operating points are likely to be different for each interferometer as even a small change in size of the interferometers will influence the optimum position of the operating points.

An alternative operating point that can be used is to tune the interferometers so that the value of transmission at the operating point is 75% of the maximum value. This point is approximately the same as the point where the second derivative becomes zero.

The operating point may be adjusted by varying any of the parameters on which q depends. Thus, the reference or measurement interferometer may be tuned to the operating point by adjusting the refractive index in the interferometer cavity or the spacing between the cavity's mirrors. Also, the wavelength of the light emitted by the light source may be adjusted to suit the intrinsic or adjusted operating point of the reference or measurement interferometer.

The reference interferometer may be configured to be unresponsive to variations in the physical parameter by isolating it from the physical parameter or by evacuating a cavity within the interferometer or by filling a cavity within the interferometer with a solid, light-transitive material, such as glass.

Typically, the measurement and/or reference interferometers are Fabry-Pérot interferometers.

The measurement and/or reference interferometers may comprise a pair of spaced apart mirrors. The mirrors may both be plane mirrors or curved mirrors or may comprise one plane and one curved mirror.

For one of the interferometers, adjustment of the operating point can be achieved by adjusting the laser wavelength (for example, by adjusting the supply current to the laser). For the other interferometer, a tuning mechanism may be provided.

Thus, the device may further comprise a thermal tuning element for tuning the operating point of either the measurement or the reference interferometer. This makes use of a thermo-optic effect to adjust the refractive index of the optical medium in the measurement or reference interferometer thermally.

The device may further comprise a tuning electrode for tuning the operating point of either the measurement or the reference interferometer. This makes use of an electro-optic effect (e.g. a linear effect such as the Pockels effect or a non-linear effect such as the Kerr effect) to adjust the refractive index of the optical medium in the measurement or reference interferometer by an externally applied electric field.

The device may further comprise a liquid crystal tuning element disposed between either the measurement or the reference interferometer and its respective detector.

In one embodiment, the device further comprises a light source controller adapted to cause the light source to emit light alternately at first and second wavelengths, the operating points of the measurement and reference interferometers being achieved at the first and second wavelengths respectively. In this way, the reference and measurement interferometers are tuned to their operating points in each alternate cycle of operation by adjusting the wavelength of the light source. This may be achieved by adjusting the supply current to the light source, for example. Thus, it is possible to omit any additional tuning elements when using this "pulsed mode" of operation.

Typically, the device further comprises an optical isolator disposed between the light source and the reference interferometer, the optical isolator comprising a linear polarizer and a quarter-wavelength plate.

Preferably, the light source is a laser.

The laser may advantageously be a double-emitting laser, first and second emitted beams being coupled to the measurement and reference interferometers respectively.

The use of a double-emitting laser allows a particularly compact structure to be produced. In this embodiment, the double-emitting laser is a double-sided emission laser diode arranged on a substrate between first and second layer structures, each forming one of the measurement and reference interferometers and each comprising two respective mirror layers spaced apart by respective spacer layers and detector layers distal from the substrate relative to the mirror layers.

The respective spacer layer for the reference interferometer will typically comprise a cavity between the two respective mirror layers, the cavity being acoustically coupled to the environment by an aperture in the spacer layer.

The first and second layer structures may each further comprise optical isolating layers disposed between the substrate and an innermost one of the respective mirror layers. The optical isolators typically comprise a linear polarizer and a quarter-wavelength plate.

The first and second layer structures may each further comprise a lens disposed between the substrate and an innermost one of the respective mirror layers. The lens may be disposed between the optical isolating layers and the innermost one of the respective mirror layers.

The detector layers may each comprise a respective photodetector.

Typically the signal processor further comprises an adaptive equalizer to equalize the average amplitude of the respective output generated by the detectors over an equalization time period. This ensures that the noise is properly cancelled even if the light power received by the two detectors varies for some reason.

In accordance with a second aspect of the invention, there is provided an optical microphone comprising a device according to the first aspect of the invention, wherein the measurement interferometer is acoustically coupled with the environment, the reference interferometer is acoustically isolated from the environment, and the physical parameter is air pressure.

The "acoustic isolation" of the reference interferometer may be achieved either by decoupling it from variations in air pressure (e.g. by not allowing fluid communication between the cavity of the reference interferometer and the environment) or by making use of a solid interferometer, which naturally is decoupled from variations in air pressure.

This microphone is particularly suited for mobile communications applications having a high SNR and being very compact.

Typically, the measurement interferometer is acoustically coupled with its environment by an aperture in a cavity of the measurement interferometer.

BRIEF DESCRIPTION OF THE DRAWINGS

Examples of the invention will now be described in detail with reference to the accompanying drawings, in which.

DETAILED DESCRIPTION OF THE DRAWINGS

Figure 1:
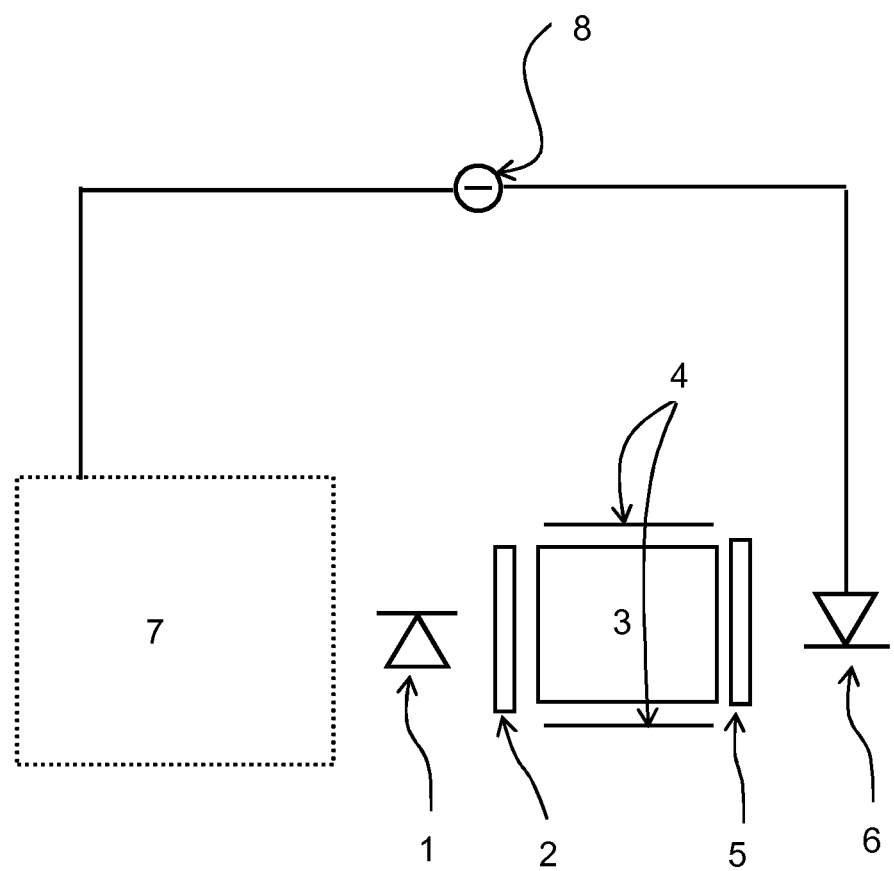
FIG. 1 shows a schematic representation of a device according to the invention.

FIG. 1 shows a laser source 1, for example a laser diode, which emits light that passes through an optical isolator 2 to a reference Fabry-Pérot interferometer or etalon 3. The reference Fabry-Pérot etalon 3 acts as a frequency discriminator. It can either be a solid etalon or an evacuated etalon or an air-spaced etalon isolated from the surrounding environment.

Tuning electrodes 4 are disposed adjacent the reference Fabry-Pérot etalon 3 and are used to influence its transmission characteristics in a way that a favorable operating point is established. This operating point usually is the inflexion point of the transmission function of the reference Fabry-Pérot etalon 3. These electrodes 4 influence the transmission characteristics by way of an electro-optic or thermo-optical effect. Alternatively, thin film resistors or Peltier elements can be used in place of the tuning electrodes 4. These make use of a thermal or thermo-optical effect to change the transmission characteristics of the reference Fabry-Pérot etalon 3 thermally.

Another way to change the transmission characteristics of the reference Fabry-Pérot etalon 3 makes use of a liquid crystal 5. This element may be placed either inside or outside the reference Fabry-Pérot etalon 3.

The tuning electrodes 4 may also be replaced by a piezoelectric element deformable by electric current, which will in turn deform the reference Fabry-Pérot etalon 3. Similarly, the liquid crystal 5, if used, may be replaced by an electricallydeformable lens. However, in some applications (such as an optical microphone) it is best to refrain from using mechanically deformable elements.

To prevent the laser source 1 from being effected by optical feedback, an optical isolator 2 is used between the laser source 1 and the reference Fabry-Pérot etalon 3. This isolator 2 is a combination of a linear polarizing filter and a quarter wave plate.

The emerging light from the reference Fabry-Pérot etalon 3 is detected by a photodetector 6, for example a PIN diode.

The light from the laser source 1 is also incident on a measurement Fabry-Pérot etalon 7, which is influenced by changes in a physical parameter (for example, air pressure). The exact manner in which the measurement Fabry-Pérot etalon 7 is caused to interact with the environment so as to be influenced by the physical parameter will depend on the nature of the physical parameter. In the case of air pressure, the measurement Fabry-Pérot etalon 7 will simply have a cavity that is coupled to the air through an aperture. This will become clearer below. The emerging light from the measurement Fabry-Pérot etalon 7 is also detected by a photodetector (not shown), for example a PIN diode. The output signal from this photodetector will depend on the fluctuations in the physical parameter to be measured and on noise from the laser source 1.

A difference signal between the output signal from this photodetector and the output signal from photodetector 6 is generated by a difference amplifier 8. By this means, common mode laser noise from laser source 1 is cancelled. In order to dynamically adjust the DC levels from both the reference path (i.e. through reference Fabry-Pérot etalon 3 and photodetector 6) and the measurement path (i.e. through measurement Fabry-Pérot etalon 7 and its photodetector), the difference amplifier 8 has a preceding gain stage where both output signals are dynamically adjusted with a long time constant.

The light from laser source 1 may be caused to impinge on both etalons 3, 7 by way of a beam splitter. Alternatively, a double-sided emission laser source may be used.

In an alternative switching mode, the tuning electrodes 4 and liquid crystal 5 are omitted. The laser source 1 is operated in pulses, alternating between the measurement path and the reference path such that successive pulses are incident on one or the other (but not both) of the reference and measurement Fabry-Pérot etalons 3, 7. In this switching mode, the operating point can be set by adjusting the current of the laser source 1 power supply. Even if the transmission peaks of the measurement Fabry-Pérot etalon 7 do not correspond to the transmission peaks of the reference Fabry-Pérot etalon 3, the ideal operating point for both etalons 3, 7 can be obtained due to the sequential mode of operation. During one cycle, the laser source 1 current is adjusted for one etalon 3, 7, and during the successive cycle, the laser source 1 current is adjusted for the other etalon 3, 7.

Noise cancellation is still carried out by difference amplifier 8 after detection by the photodetectors. The switching mode is less effective for laser noise cancellation than the continuous mode using the tuning electrodes 4 or liquid crystal 5. However, computer simulation has shown that 1/f noise can be successfully canceled nevertheless. It does have the advantage of allowing a more compact device to be constructed (due to the omission of tuning electrodes 4 and liquid crystal 5) and having a lower overall power consumption.

As can be seen, this embodiment works by generating a noise signal (representing the noise from laser source 1) using a reference Fabry-Pérot etalon 3 and subtracting this noise signal from the signal generated using a measurement Fabry-Pérot etalon 7 to improve the measurement Fabry-Pérot etalon's 7 SNR. Both etalons 3, 7 should preferably be operated at the inflexion points of their respective transmission functions. At this point, a linear relationship between the physical parameter being measured and light output and a linear relationship between frequency noise and light output is achieved. The slope steepness of the etalons 3, 7 can be adjusted by choice of mirror reflectivity and mirror distance in a way that the physical parameter being measured and the frequency noise are not generating amplitudes which would move too far away from the ideal operating point (i.e. the inflexion points of the periodic transmission functions). Using this embodiment, frequency and phase fluctuations in the laser source 1 are prevented from impairing the performance of the device, and it is possible to reach the quantum or shot noise limit, even when laser source 1 is an unsterilized laser diode.

Figure 2:
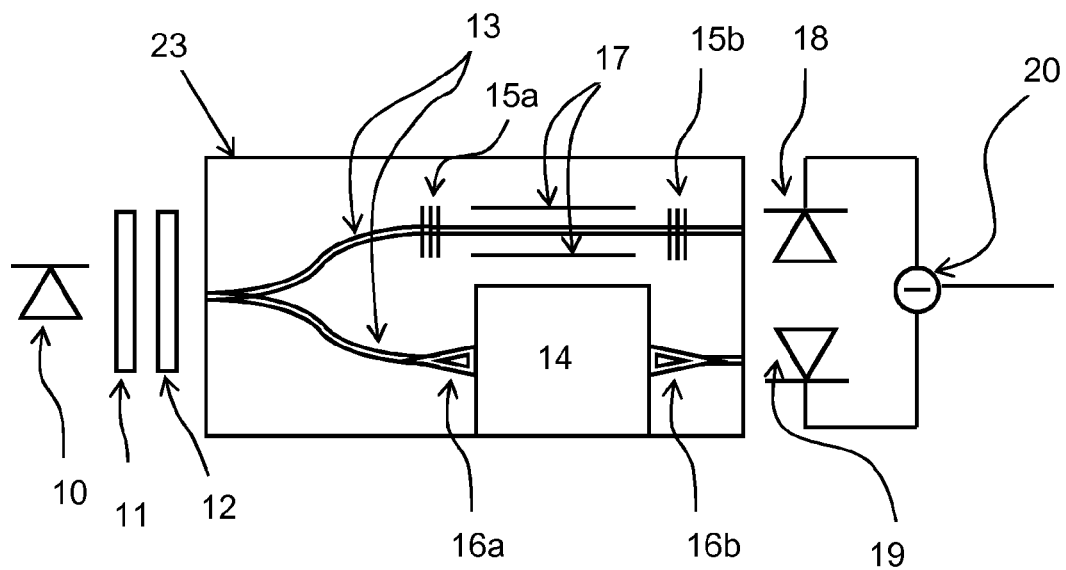
FIG. 2 shows a schematic representation of an optical microphone.

FIG. 2 shows an optical microphone based on the same principle as the embodiment of FIG. 1. The optical microphone of FIG. 2 has the significant advantage that it can be manufactured without any moving parts, such as a membrane typically required in conventional miniature microphones. It therefore has a compact size and is very robust.

Furthermore, the influence of the tuning elements (8) is intensified because of the small distance between them. For instance, the tuning mechanism may be proportional to the electric field which, in turn, is proportional to the distance between the electrodes (8).

Laser light emitted from a laser source 10 (e.g. a PIN diode) is incident on an optical isolator consisting of a linear polarizing filter 11 and a quarter wavelength plate 12. Thereafter, the light is coupled into a waveguide structure 13, which splits the light so that it is transmitted along a measurement path, whose main element is a measurement Fabry-Pérot etalon 14, and a reference path, whose main element is a reference Fabry-Pérot etalon formed by two mirrors 15a, 15b.

Tapered waveguide structures 16a, 16b are provided to couple the waveguide structure 13 into the measurement Fabry-Perot etalon 14. These ensure efficient coupling into the measurement Fabry-Pérot etalon 14. The tapering reduces the divergence of the light emerging from the waveguide structure 13. The reduction of divergence occurs in the dimension parallel to the plane of the substrate 23, typically Lithium Niobate, on which the optical microphone is built.

The reference cavity can be tuned by tuning electrodes 17 or thin film resistors in the same manner as described with the embodiment of FIG. 1.

Light emitted from the reference and measurement 14 Fabry-Perot etalons is incident on respective photodetectors 18, 19 and the difference signal is obtained by a difference amplifier 20.

Figure 3A:
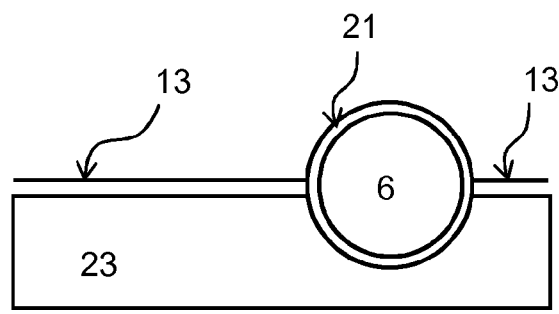
FIGS. 3a and 3b show cross-sections through a measurement interferometer in the optical microphone of FIG. 2.
Figure 3B:
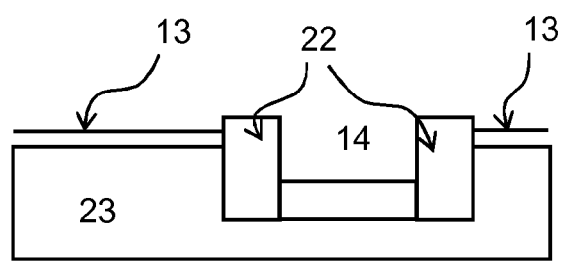

The measurement Fabry-Perot etalon 14 can be realized in two different ways shown in FIGS. 3a and 3b. In FIG. 3a, a concentric mirror structure 21 (for example, either a tube or a hollow core fibre) is used. In FIG. 3b, a plane parallel etalon is made by opposed parallel plane mirrors 22.

The laser source 10 can be operated in a pulsed switching mode as with the embodiment of FIG. 1. Two different switching modes, based on two duty cycles of different lengths, are envisaged, allowing for high SNR and low SNR operation. In the low SNR operational mode, the current consumption is greatly reduced as the duty cycle is lower.

It is possible to manufacture the optical microphone of FIG. 2 using silicon on insulator (SOI) techniques. A major advantage of the waveguide structure 13 is the possibility to integrate the reference path so that it has small physical dimensions; the reference Fabry-Pérot etalon may have dimensions of typically 1 μm to 1 mm (length) and 1 μm (width).

In order to act as a microphone, the measurement Fabry-Pérot etalon 14 is acoustically coupled to the environment (e.g. air). This is done by making a hole in the measurement Fabry-Pérot etalon 14, which provides fluid communication between an air-filled cavity in the measurement Fabry-Pérot etalon 14 with the surrounding air. Thus, variations in air pressure (such as caused by an acoustic wave) are coupled to the air-filled cavity and influence the refractive index within the cavity, which is detected as a variation in light intensity at photodetector 19.

Figure 4:
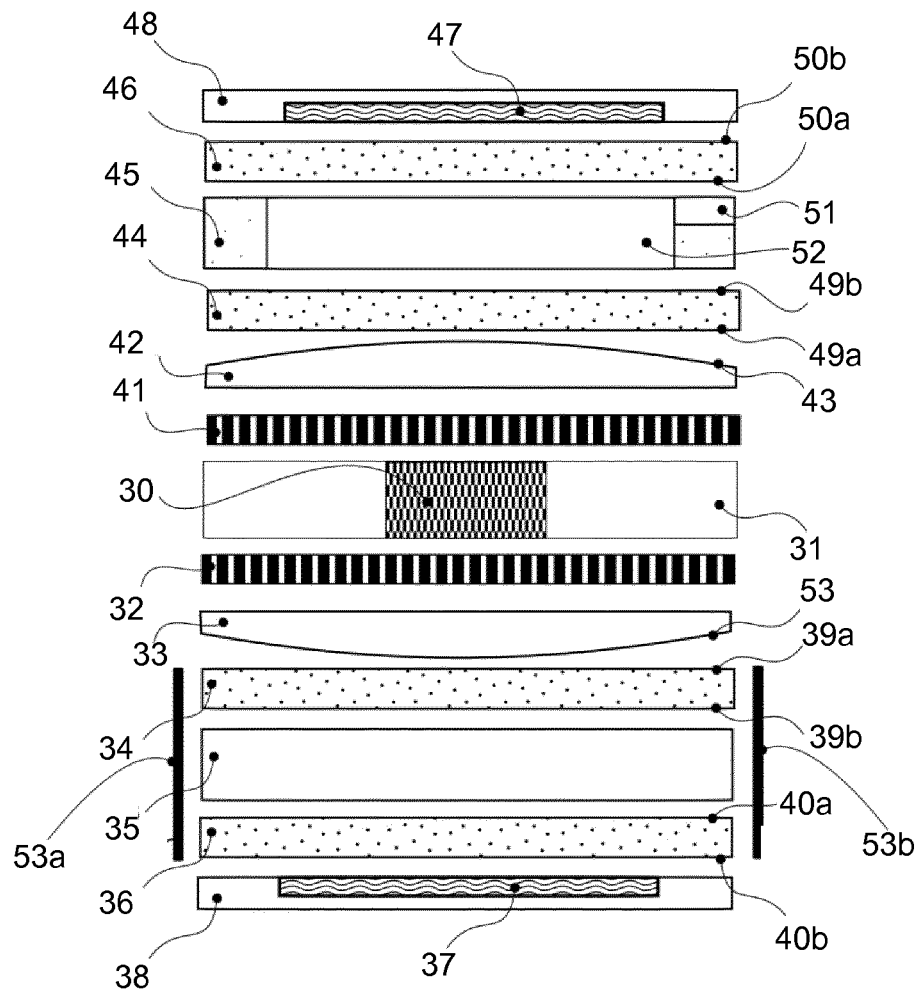
FIG. 4 shows a cross-section through a layer structure by which such an optical microphone can be made.
Figure 5:
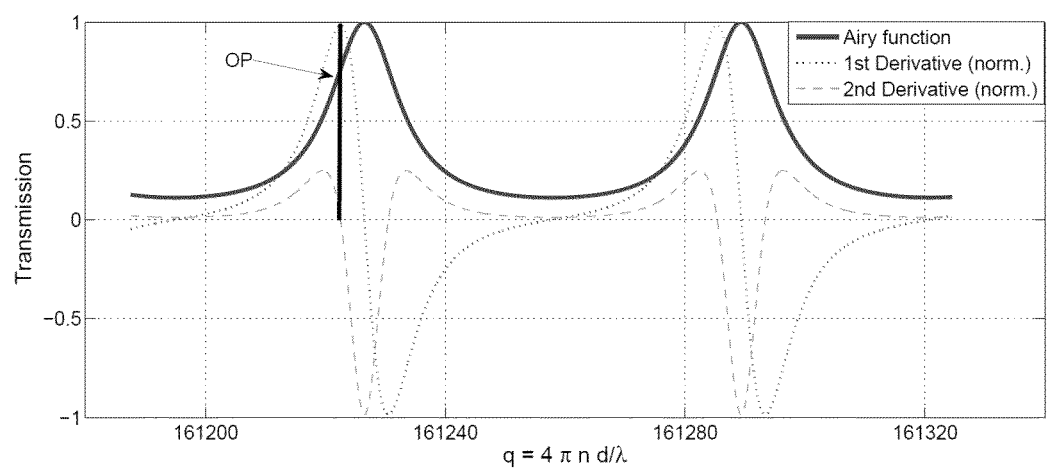
FIG. 5 shows the transmission function of an interferometer.

One possible way of making an optical microphone similar to that of FIG. 2 (although without the waveguide structure) is illustrated in FIG. 4. This is a stacked or layer structure design, in which several thin optical layers and elements are stacked in contact with each other. Consequently, a compact and robust sensor is obtained. In order to omit the waveguide beam splitter used in FIG. 2, a laser diode with double-sided emission 30 embedded in a substrate 31 is employed. This laser diode 30 can be a vertical cavity surface-emitting laser (VCSEL). The VCSEL can either be modified by partial removal of the substrate to allow light to be emitted from both the front and the rear sides, or, a double-sided emission can be specially manufactured by omitting part of the substrate. Another device that can be used (again, either by modification or special manufacture) for double-sided emission is a distributed feedback (DFB) laser diode.

The layers of the stack can consist of glass, polymer, silicon or other dielectric layers, depending on the wavelength of light emitted by laser diode 30 and the desired mechanical processing properties. Also a combination of materials in the stack is possible. The layers may be combined using bonding, gluing or other technologies.

One of the emerging laser beams is incident on a reference path; the other laser beam, emitted from the opposite side is incident on a measurement path. The reference path consists of the following elements (in order of transition): an optical isolating layer 32, collimating lens 33 with anti-reflection coating 53, first mirror 34 of a reference Fabry-Pérot etalon, a spacer element 35, second mirror 36 of reference Fabry-Pérot etalon, and photodetector 37 embedded in substrate 38. The reference Fabry-Pérot etalon is thus fabricated from first and second mirrors 34, 36 and the spacer element 35, which spaces the two mirror 34, 36 apart. Each of the mirrors 34, 36 is provided with anti-reflection coatings 39a, 39b, 40a, 40b.

The measurement path is similar in construction. It consists of the following elements (in order of transition): an optical isolating layer 41, collimating lens 42 with anti-reflection coating 43, first mirror 44 of a measurement Fabry-Pérot etalon, a spacer element 45, second mirror 46 of measurement Fabry-Pérot etalon, and photodetector 47 embedded in substrate 48. The measurement Fabry-Pérot etalon is thus fabricated from first and second mirrors 44, 46 and the spacer element 45, which spaces the two mirror 44, 46 apart. Each of the mirrors 44, 46 is provided with anti-reflection coatings 49a, 49b, 50a, 50b.

The spacer element 45 has an opening or aperture 51 by way of which the air in cavity 52 is coupled to the environment. The pressure of the air in cavity 52 is therefore influenced by pressure changes in the environment. This in turn effects the optical transmission characteristics of the measurement Fabry-Pérot etalon, and variations in air pressure will be detected as variations in output signal from photodetector 47. Thus, the device responds to an acoustic wave and acts as a microphone.

To influence the transmission characteristic of the reference cavity, tuning electrodes 53a, 53b are used. The manner in which these work is the same as tuning electrodes 4 described with reference to the embodiment of FIG. 1.

The resulting layer structure results in a very compact optical microphone and the two light beams lie on the same spatial axis. Both aspects are favorable for a cost-effective, mass producible miniature device. It is therefore very suitable for mobile communications applications.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A device comprising measurement and reference interferometers, each configured to receive light from the same light source and to emit light to respective detectors and having a respective operating point, wherein the measurement interferometer is acoustically coupled with the environment and configured to respond to variations in a physical parameter by varying the intensity of light emitted, whereas the reference interferometer is acoustically isolated from the environment and configured to be unresponsive to variations in the physical parameter, the device further comprising a signal processor for generating a difference output signal depending on respective output signals generated by the detectors.

2. The device according to claim 1, wherein the signal processor comprises a difference amplifier and a preceding gain stage for dynamical adjustment of the DC levels of the respective output signals generated by the detectors.

3. The device according to claim 1, wherein the measurement and/or reference interferometers are Fabry-Perot interferometers.

4. The device according to claim 3, the measurement and/or reference interferometers each using mechanically rigid and/or immovable elements.

5. The device according to claim 4, wherein the measurement and/or reference interferometers comprise a pair of spaced apart mechanically rigid and/or immovable mirrors.

6. The device according to claim 1, further comprising a thermal tuning element for tuning the operating point of either the measurement or the reference interferometer.

7. The device according to claim 1, further comprising a tuning electrode for tuning the operating point of either the measurement or the reference interferometer.

8. The device according to claim 1, further comprising a liquid crystal tuning element disposed between either the measurement or the reference interferometer and its respective detector.

9. The device according to claim 1, further comprising a light source controller adapted to cause the light source to emit light alternately at first and second wavelengths, the operating points of the measurement and reference interferometers being achieved at the first and second wavelengths respectively.

10. The device according to claim 1, further comprising an optical isolator disposed between the light source and the reference interferometer, the optical isolator comprising a linear polariser and a quarter-wavelength plate.

11. The device according to claim 1, wherein the light source is a laser.

12. The device according to claim 11, wherein the laser is a double-emitting laser, first and second emitted beams being coupled to the measurement and reference interferometers respectively.

13. The device according to claim 12, wherein the double-emitting laser is a double-sided emission laser diode arranged on a substrate between first and second layer structures, each forming one of the measurement and reference interferometers and each comprising two respective mirror layers, mechanically rigid and/or immovable mirror layers, spaced apart by respective spacer layers and detector layers distal from the substrate relative to the mirror layers.

14. The device according to claim 1, wherein the signal processor further comprises an adaptive equaliser to equalise the average amplitude of the respective output generated by the detectors over an equalisation time period.

15. An optical microphone comprising the device according to claim 1, wherein the physical parameter is air pressure.

16. The optical microphone according to claim 15, wherein the measurement interferometer is acoustically coupled with its environment by an aperture in a cavity of the measurement interferometer.

* * * * *